United States Patent [19]
Shah

[11] Patent Number: 5,851,034
[45] Date of Patent: Dec. 22, 1998

[54] PIPE SWIVEL JOINT WITH REMOVABLE PLUG FOR MAIN SEAL REPLACEMENT

[75] Inventor: Jayesh Shah, Owings Mills, Md.

[73] Assignee: Assen Exports Inc., Owings Mills, Md.

[21] Appl. No.: 620,990

[22] Filed: Mar. 22, 1996

[51] Int. Cl.⁶ ............................ F16L 55/00; F16L 27/08
[52] U.S. Cl. ...................... 285/16; 285/110; 285/272.1; 285/281; 285/276
[58] Field of Search ................ 285/16, 276, 281, 285/275, 272, 110, 272.1

[56] References Cited

U.S. PATENT DOCUMENTS

| | | | |
|---|---|---|---|
| 2,817,543 | 12/1957 | Corsette | 285/281 |
| 3,517,952 | 6/1970 | McCracken | 285/276 |
| 3,768,840 | 10/1973 | Upton et al. | 285/16 |
| 4,022,498 | 5/1977 | Jameson | 285/16 |
| 4,995,457 | 2/1991 | Baldridge | 285/281 X |

*Primary Examiner*—Randolph A. Reese
*Assistant Examiner*—Heather Shackelford
*Attorney, Agent, or Firm*—Leonard Bloom

[57] ABSTRACT

A pipe swivel joint comprises a female conduit element and a male conduit element rotatably engaging the female conduit element. A removable plug within the female conduit element maintains a main seal in proper position for bridging a clearance between the female and male conduit elements. The plug is easily removed once the main seal is to be replaced, and is installed back in place once the main seal has been replaced, thereby avoiding dismantling of the swivel joint.

7 Claims, 5 Drawing Sheets

PIPE SWIVEL JOINT WITH REMOVABLE PLUG FOR MAIN SEAL REPLACEMENT

BACKGROUND OF THE INVENTION

The present invention relates to a pipe swivel joint, and more particularly, to a flanged-end type pipe swivel joint with a removable plug element for changing a main seal.

Pipe swivel joints are extensively used for interconnecting pipe sections of articulated fluid transfer equipment, for instance, of the pantograph assembly for refueling of helicopters, aircrafts and the like. Generally, the pipe swivel joints comprise male and female sections which are rotatably mounted together by annular ball and roller bearing systems and have a continuous fluid passage therethrough. The both bearing systems (for the balls and the rollers) provide two important functions. They serve as a means to rotate the male and female sections with respect to each other, and they securely interconnect the two sections against movement in an axial direction with respect to each other.

Since the male and female sections must be capable of relative rotation, they cannot be tightly secured at the interface, and, as a result, a path is present at their interface through which the balls and rollers bearing systems can be contaminated. Since the both bearing systems are manufactured to rather close tolerances, they are susceptive to binding when contaminated by materials entering either through the path between the male and female sections or while dismantling the swivel joint for service. As the result, the swivel joint may function improperly.

In order to overcome the above-discussed problem, a variety of sealing means, preventing contamination of bearing systems within the swivel joints have been designed. For instance, U.S. Pat. No. 3,727,950 discloses a one-piece dirt seal ring of elastomeric construction, having an annular body portion designed for fitting into a groove in the outer surface of the male element. As a further example, U.S. Pat. No. 4,462,617 discloses the dual packing seal arrangement between the pipes acting as a barrier to the fluid flow into the swivel. The seal arrangement is installed at the interface between one of the pipes and the stuffing box which is threaded into the end of another pipe.

Among many other seals, the main seals have been developed for precluding entry of the fluid which is conveyed through the pipe swivel joint from inside the swivel joint into the balls and rollers race chambers.

The main seals are described, for instance, in U.S. Pat. Nos. 4,139,220 and 4,626,003.

The U.S. Pat. No. 4,139,220 discloses a fluid conducting swivel joint having a sealing system effective against the leakage of fluids at extreme temperature. The joint consists of two housings having a fluid passage therethrough and mounted for relative rotation about their axis. An annular sealing chamber having a seal therein, surrounds the fluid passage. The seal engages both housing members to bridge the interface therebetween and acts as a barrier which blocks most (not all) of the fluid leakage from the fluid passage.

The U.S. Pat. No. 4,626,003 discloses a swivel seal assembly having greatly improved useful life without leakage of fluid from a swivel joint. The seal assembly includes one or more annular sealing rings rotatably positioned between an outer joint member (female element) and an inner joint member (male element).

Although the above-described main seals function effectively, they however need to be replaced periodically with new ones.

Disadvantageously, when such a replacement is undertaken, the swivel joint must be dismantled, such that the ball and roller bearing systems, as well as the male and female elements of the swivel joint, are taken apart. The operation of the main seal replacement, therefore, becomes time and labor consuming.

Besides, during the dismantling of the swivel joint, the ball and roller bearings are susceptive to contamination by outside materials, that may cause the improper functioning of the swivel joint.

Therefore, it would be highly desirable to avoid dismantling of the swivel joint during the main seal replacement.

BRIEF SUMMARY OF THE INVENTION

It is, therefore, an object of the present invention to provide a method for replacement the main seal which does not require dismantling of a swivel joint wherein the main seal is installed.

It is another object of the present invention to provide an improved pipe swivel joint with a main elastomeric lip seal maintaining a tight sealing between the swivel joint's relatively rotatable elements, wherein replacement of the main seal does not require to take the swivel apart.

It is still an object of the present invention to provide a swivel joint comprising a plug capable of being easily removed for changing the main seal without dismantling roller and ball bearings of the pipe swivel joint, that will result in the faster service operation and avoiding contamination by materials which may enter while the swivel joint is dismantled for services.

The present invention finds particular utility in a built-in flange-ended type pipe swivel joint comprising female and male conduit elements which rotatably engage each other by means of annular ball and roller bearings. A main seal is installed within the swivel joint in order to bridge a clearance between the male and female conduit elements and to protect the ball and roller bearings against contamination from inside of the swivel joint.

According to the teaching of the present invention, a removable plug is provided within the female conduit element for maintaining the main seal in proper functional position (i.e., in sealing contact with three joint elements: female and male conduit elements, and the plug). The plug can be easily removed for replacement of the main seal, and installed back into place thereafter.

The male conduit element includes a generally cylindrical inner member having an outer surface and a first passage portion extending axially through the inner member.

The female conduit element, preferably, includes a generally cylindrical outer member having first and second internal bores extending axially therethrough. The second internal bore has a larger diameter than the first internal bore.

The plug, preferably, includes a generally cylindrical body and an annular elevated portion (on its upper surface) integral therewith. A second passage portion extends axially through the plug.

When the first internal bore of the female conduit element receives the inner member of the male conduit element and the second internal bore of the female element receives the general cylindrical body of the plug, then said first passage portion in the male conduit element in communication with said second passage portion in the plug define a continuous passage for a media (a fluid) to be transported through said pipe swivel joint.

The main seal is supported by the removable plug in tight sealing engagement between the upper surface of the cylindrical body of the plug and the proximal end of the inner member of the male conduit element, and between the second outer surface of the annular elevated portion of the cylindrical body of the plug and the first internal bore within the outer member of the female conduit element, such that the main seal prevents the fluid transported through the swivel joint from entering the bearings chambers. The main seal is preferably a lip-type seal comprising a substantially annular body made of an elastomeric material having an inward lip portion and an outer lip portion. The main seal surrounds the annular elevated portion of the removable plug, such that the inward lip portion faces the outer surface of said annular elevated portion, and such that the outer lip portion engages the first internal bore of the outer member of the female conduit element.

The main elastomeric seal can include a combination seal: combination of PTFE outer seal with Viton Insert, Buna-N Insert or other elastomeric materials providing extra sealing strength.

A second seal (for instance, V-seal) is provided between the annular flange of the male conduit element and the adjustment end of the outer member of the female conduit element for preventing the bearings from contamination by outer materials.

The cylindrical body of the plug, preferably, is provided with external threads, and a second internal bore of the outer member of the female conduit element is provided with internal threads, such that the removable plug threadably engages the female conduit element.

The female and male conduit elements include respective flanges for engagement with respective pipe sections of articulated media transfer equipment (for instance, Pantograph assembly) to be connected.

The removable plug is an integral member made either of carbon steel, stainless steel or an alloyed material.

These and other objects of the present invention will become apparent from a reading of the following specification taken in conjunction with the enclosed drawings.

DESCRIPTION

Figure 1:
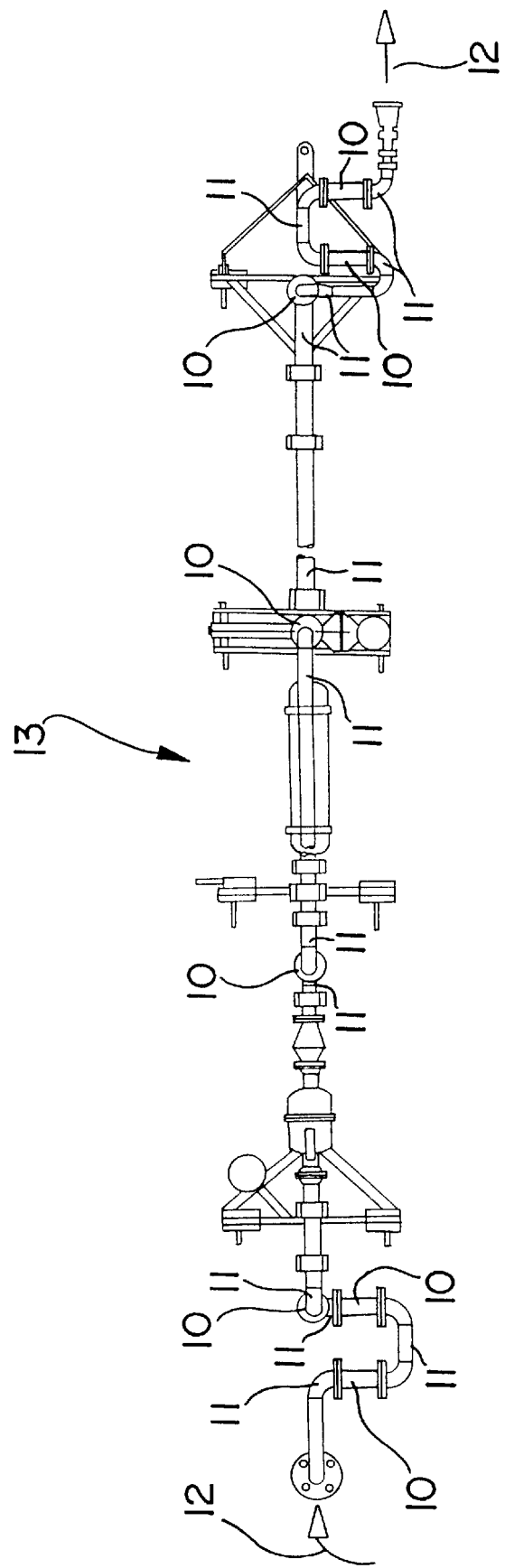
FIG. 1 shows somewhat schematically articulated fluid transfer equipment for refueling of helicopters, aircrafts and the like, wherein the swivel joint of the present invention is employed.

With reference to FIGS. 1–5, a swivel joint 10 is a built-in flanged-end type pipe swivel joint for interconnection of pipe sections 11 of articulated fluid 12 transfer equipment 13; this is a well known pantograph assembly (best shown in FIG. 1) for refueling of helicopters, aircrafts and the like.

As best shown in FIGS. 2–5, the swivel joint 10 comprises a male conduit element 14 and a female conduit element 15 rotatably secured together by annular ball bearings 16 and an annular roller bearing 17. The ball and roller bearings 16, 17 also prevent the female and male conduit elements 15, 14 from axial movement in respect to each other.

Since the ball and roller bearings 16, 17 are so important for proper functioning of the swivel joint 10, they are to be protected from inside and outside contamination. The contamination of the ball bearing race chambers 18 and roller bearing race chamber 19 usually takes place by the fluid 12 transported through the swivel joint 10 via a clearance 20 existing between the male and female conduit elements 14, 15, and/or by outside materials via a clearance 21 between the female conduit element 15 and a flange 22 of the male conduit element 14 (discussed further). In order to protect the bearings 16, 17 from inside and outside contamination, the swivel joint 10 is provided with a main seal 23 sealing the clearance 20 and a second seal 24 bridging the clearance 21.

As best shown in FIGS. 2–5, a removable plug 25 is secured to the female conduit element 15 in order to maintain the main seal 23 in proper functioning position for bridging the clearance 20. Once the main seal 23 is to be replaced, the plug 25 can be easily removed and installed back in place as the main seal 23 has been replaced with a new one.

Figure 2:
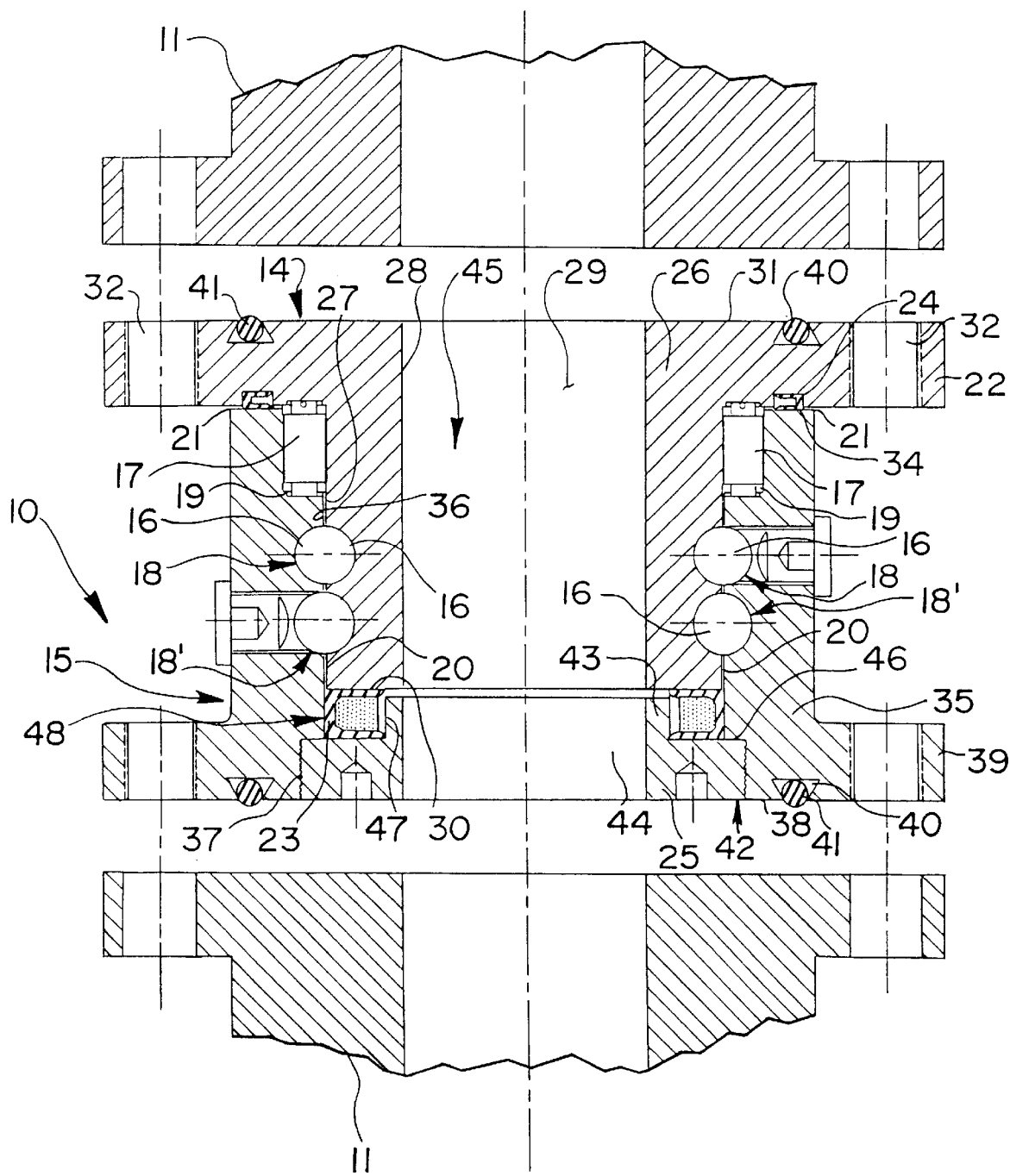
FIG. 2 is a longitudinal cross-section view of the swivel joint of the present invention (the plug is installed to place).
Figure 3:
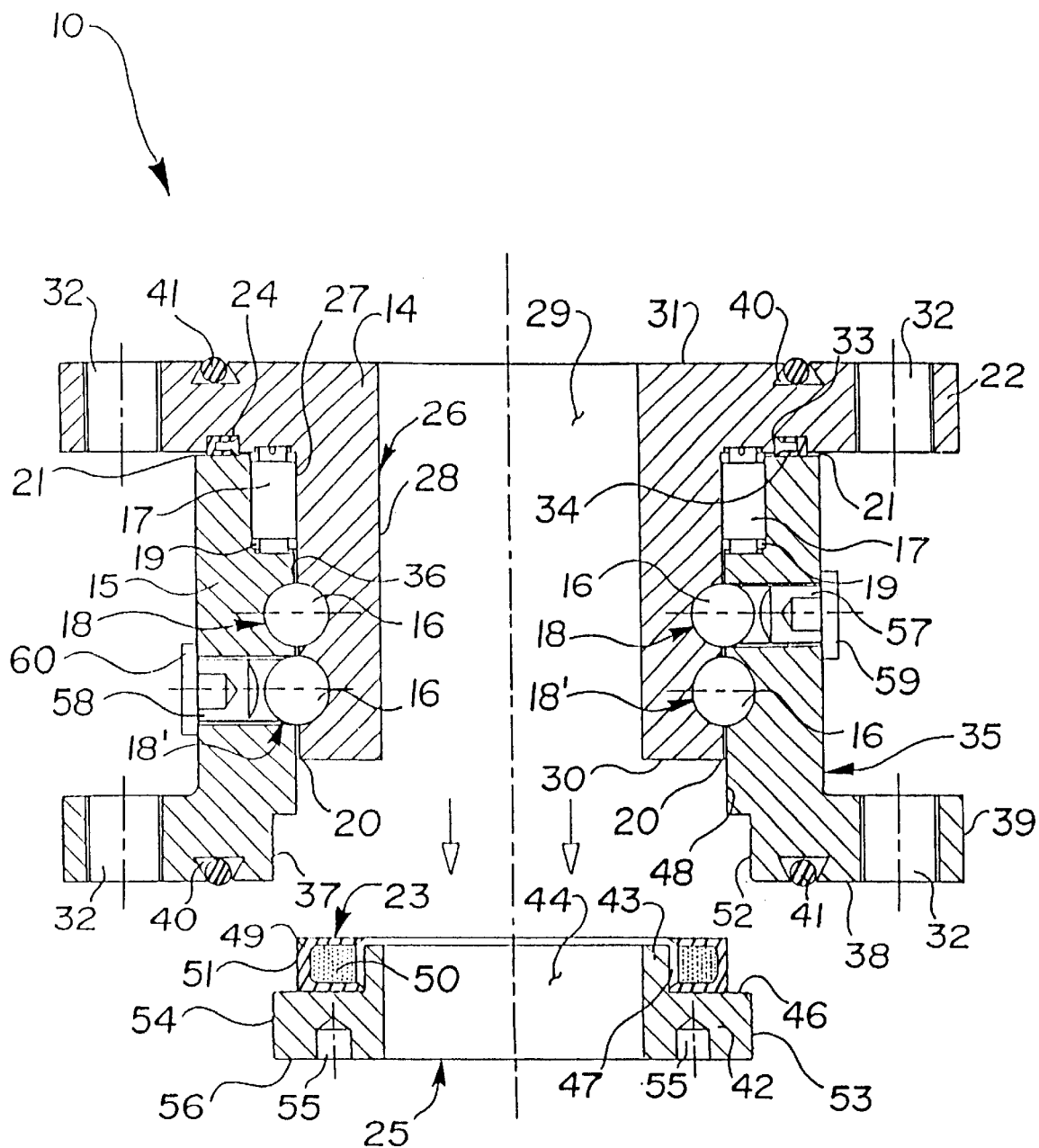
FIG. 3 is a longitudinal cross-section view of the swivel joint of the present invention (the plug is removed for replacement of the main seal).
Figure 4:
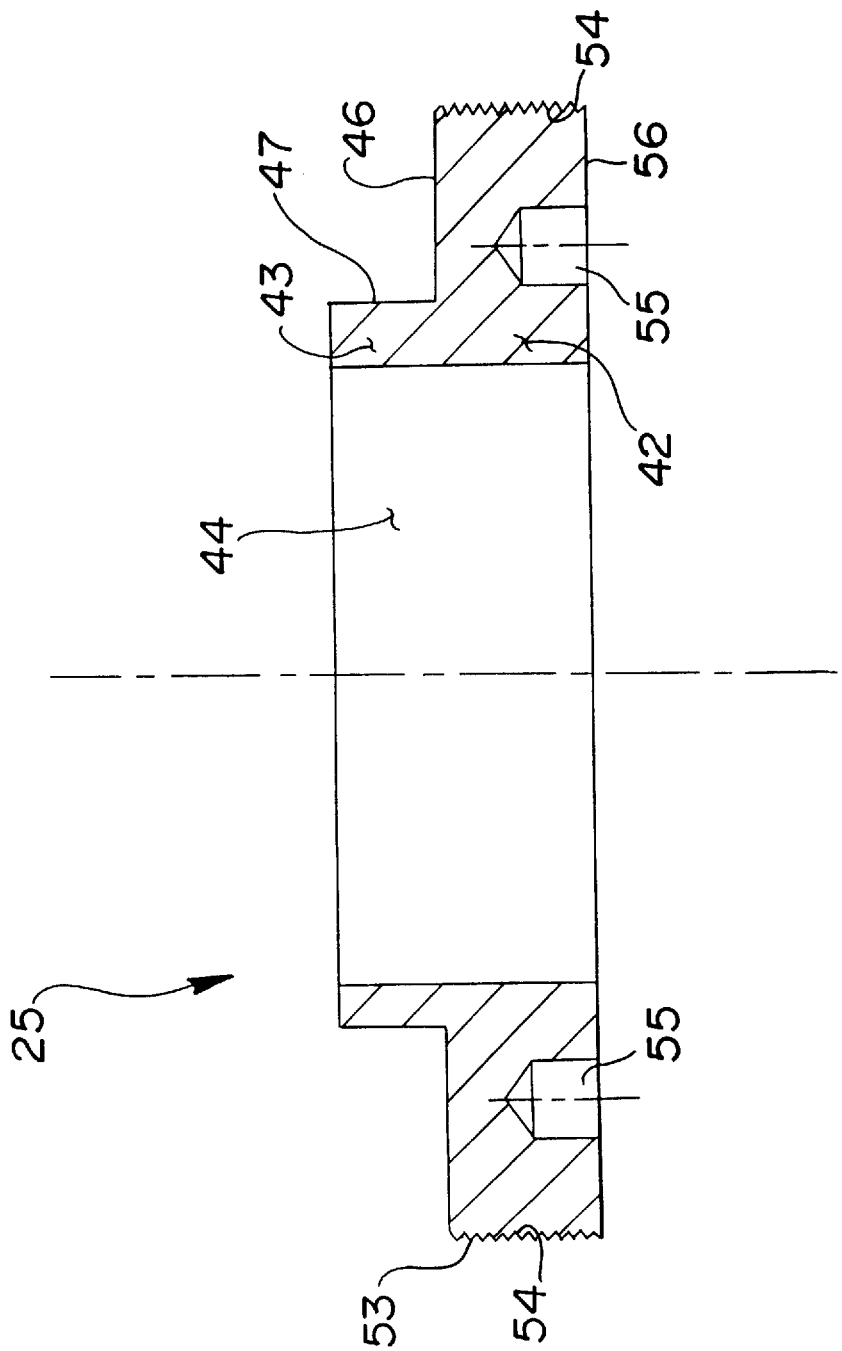
FIG. 4 shows on an enlarged scale the longitudinal cross-section of the plug of the present invention.

As best shown in FIGS. 2 and 3, the male conduit element 14 includes a generally cylindrical inner member 26 having an outer surface 27 and an inner surface 28 defining a passage (first passage portion) 29 extending axially the length of the male conduit element 14. The inner member 26 has a proximal end 30 and a distal end 31. The distal end 31 is a built-in flanged end provided with an annular flange (first flange) 22 for being connected to a respective pipe section 11. Holes 32 are provided on the flange 22 for allowing securing means (not shown) therethrough. Preferably, each flange 22 is provided with eight ⅝ UNC tap holes circumferentially spaced apart along the flange 22 equally distanced from each other.

The flange 22 has an annular groove 33 for retaining the second seal 24 bridging the clearance 21 between the flange 22 and the end 34 of the female conduit element 15.

As best shown again in FIGS. 2 and 3, the female conduit element 15 includes a generally cylindrical outer member 35 having a first internal bore 36 and a second internal bore 37. Both internal bores 36, 37 extend axially through the outer member 35 such that the sum of the lengths of the internal bores 36 and 37, respectively, and the roller bearing race 19 constitutes the length of the outer member 35. The internal bore 37 is wider than the internal bore 36. The outer member 35 has the end 34 (discussed above) and an opposite end 38; and this end 38 has an annular flange 39 serving for connection to a respective pipe section 11. Similar to the flange 22, the flange 39 also has eight holes 32 facilitating the above-said connection. Both flanges, 22 and 39, are provided with annular grooves 40 for retaining a respective "O" ring seal 41 which fits into the respective groove 40 for sealing flanges of the male or female conduit elements 22, 39 with companion flanges of the respective pipe sections 11. The "O" ring seal 41 prevents any flange joint leakage and requires much less forces to be applied in order to tighten the flange joints. By employing the "O" ring seal 41, the installation of gaskets between companion flanges for maintaining pressure tight flange joints can be avoided.

As best shown in FIGS. 2–5, the plug 25 includes a generally cylindrical body 42 and an annular elevated portion 43 integral therewith. The plug 25 is made of either carbon steel, stainless steel or an alloyed material. A passage (second passage portion) 44 extends axially through the plug 25. When the plug 25 is installed, and the inner member 26 of the male conduit element 14 is received within the internal bore 36 of the female conduit element 15, the passage 29 is in communication with the passage 44 define a continuous passage 45 for the fluid 12 transported through the pipe swivel joint 10.

The main seal 23 is supported by the plug 25 between the upper surface 46 of the cylindrical body 42 and the proximal end 30 of the inner member 26 of the male conduit element 14, and between the outer surface 47 of the elevated portion 43 and a portion 48 of the internal bore 36 of the female conduit element 15.

The main seal 23 is a lip-type elastomeric seal having an annular body 49 surrounding the elevated portion 43 of the plug 25. The main seal 23 has an inner annular seal portion 50 facing the outer surface 47 of the elevated portion 43 (as shown more clearly in FIG. 3) and further has an outer annular portion 51 facing the portion 48 of the internal bore 36 of the female conduit element 15.

In combination with the dirt seal 24 (which is preferably, a lip-type seal or "V" seal) the main seal 23, provides a reliable sealing of the clearance 20.

Figure 5:
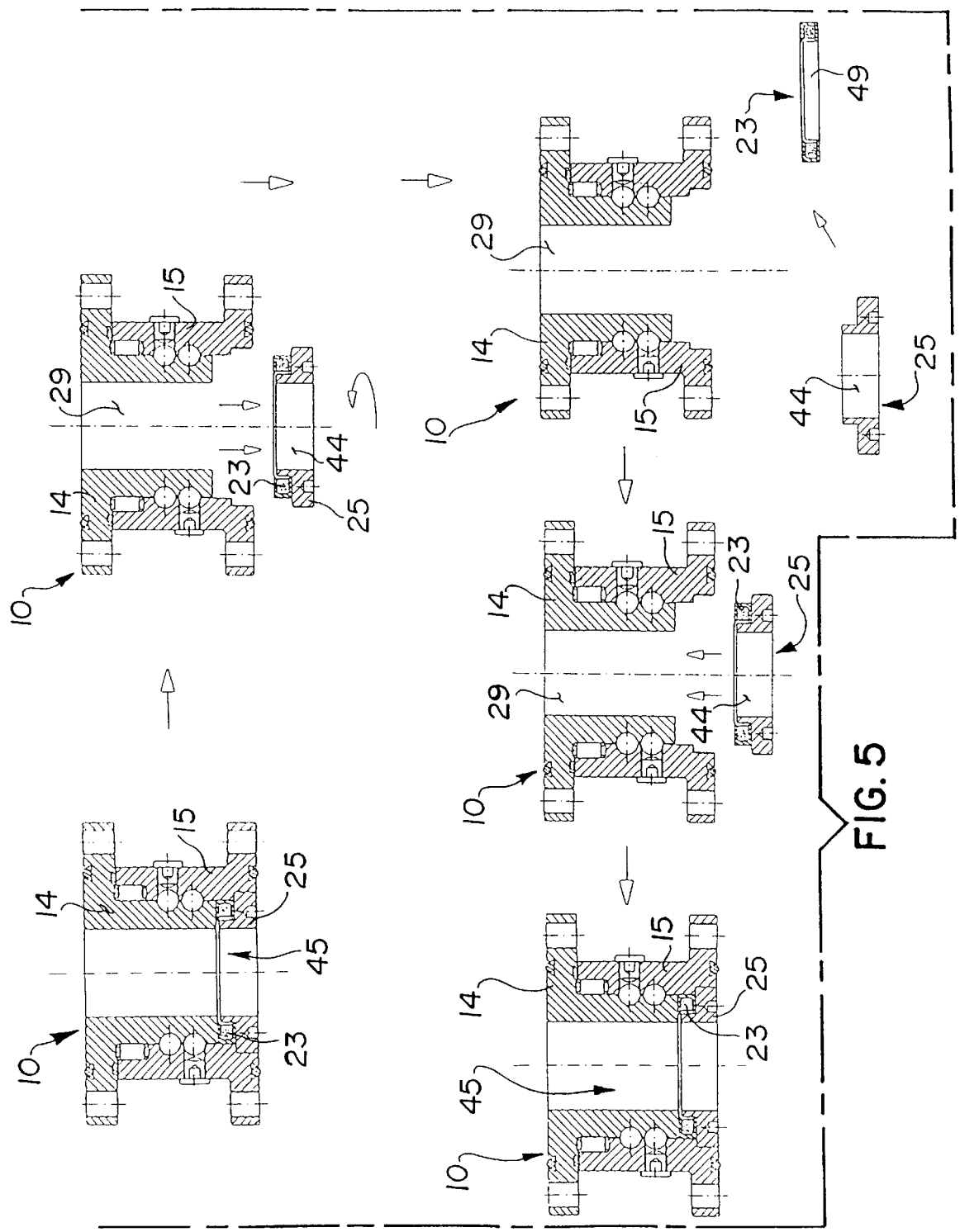
FIG. 5 shows the sequence of operations for replacement of the main seal in the swivel joint of the present invention.

The internal bore 37 of the female conduit element 15 is provided with internal threads 52. The outer surface 53 of the cylindrical body 42 of the plug 25 is also threaded and has external threads 54. Thus, when the plug 25 is to be removed for the main seal 23 replacement (as best shown in FIG. 5), the plug 25 is rotated by means of a special spanner (not shown) inserted into the holes 55. The holes 55 (preferably, ø02–10) are provided on the bottom 56 of the plug 25 for rotation of the plug for removal. After the main seal has been replaced, the plug 25 is very easily installed into the swivel joint, and because of its configuration cannot be installed incorrectly.

As best shown in FIGS. 2, 3, the ball bearings 16 are introduced into their chace chambers 18 and 18' through threaded access passages 57, 58 which are closed by threaded plugs built-in with grease nipples 59, 60.

As it will be appreciated by those skilled in the art, the main elastomeric seal 23 is a combination seal (PTFE outer seal with Viton Insert, Buna-N Insert or other elastomeric materials) and provides extra sealing strength for the swivel joint 10.

As discussed above, the removable plug for changing the main seal without dismantling roller and ball bearing of the built-in flanged-end type swivel joint, will result in the faster service operation of changing the main seal, and maintaining a yieldable yet tight seal between the male and female conduit elements.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A swivel joint, comprising:

a female conduit element a male conduit element rotatably engaging the female conduit element, wherein a clearance exists therebetween, a main seal, and a removable plug within the female conduit element maintaining the main seal in proper position for bridging said clearance between the female and male conduit elements, such that the plug is removed to replace the main seal, and such that the plug is installed back in place once the main seal has been replaced, wherein the male conduit element includes a generally cylindrical inner member having a first passage portion extending axially therethrough;

wherein the female conduit element includes a generally cylindrical outer member having first and second internal bores extending axially therethrough a first length and a second length thereof, respectively, the second internal bore being of a larger diameter than the first internal bore, wherein the plug includes a generally cylindrical body and an annular elevated portion integral therewith, a second passage portion extending axially therethrough, wherein the generally cylindrical body has a first outer surface, and wherein the annular elevated portion has a second outer surface;

wherein the first internal bore of the female conduit element receives the inner member of the male conduit element and the second internal bore of the female element receives the general cylindrical body of the plug, and wherein said first passage portion in the male conduit element is in communication with said second passage portion in the plug, thereby defining a continuous passage for a media to be transported through said swivel joint, wherein at least one bearing element is provided between the inner member of the male conduit element and the outer member of the female conduit element for rotatable engagement therebetween, wherein said clearance is formed between the outer surface of the inner member of the male conduit element and said first internal bore of the female conduit element, wherein the inner member of the male conduit element has a proximal end, wherein the cylindrical body of the plug has an upper surface, and wherein the main seal is supported by the removable plug in tight sealing engagement between the upper surface of the cylindrical body of the plug and the proximal end of the inner member of the male conduit element, and between the second outer surface of the annular elevated portion of the cylindrical body of the plug and the first internal bore within the outer member of the female conduit element, such that the main seal prevents the media transported through the swivel joint from entering said clearance, thereby preventing the bearing element from being contaminated by the media being transported through the swivel joint.

2. The swivel joint of claim 1, wherein the main seal is a lip-type seal comprising a substantially annular body made of an elastomeric material surrounding the annular elevated portion of the removable plug and having an inward annular portion and an outer annular portion, such that the inward annular portion faces the second outer surface of the annular elevated portion of the plug, and such that the outer annular portion engages the first internal bore of the outer member of the female conduit element.

3. The swivel joint of claim 1, wherein said inner member of the male conduit element includes a distal end spaced from said proximal end thereof, wherein a first annular flange is provided at said distal end, wherein said outer member of the female conduit element has first and second ends, said first end engaging said first annular flange, wherein a second seal is provided between the first annular flange of the male conduit element and the first end of the outer member of the female conduit element preventing an outer contamination from entering into said at least one bearing element.

4. In combination with interconnected pipe sections of articulated media transfer equipment, the swivel joint of claim 3, wherein said second end of the outer member of the female conduit element includes a second annular flange, and wherein said first and second annular flanges engage respective pipe sections to be connected.

5. The swivel joint of claim 1, wherein said at least one bearing element is a ball bearing system.

6. The swivel joint of claim 1, wherein said at least one bearing element is a roller bearing system.

7. The swivel joint of claim 1, wherein said at least one bearing element includes a ball-and-roller bearing system.

* * * * *